US006553831B1

(12) United States Patent
Schmidt et al.

(10) Patent No.: US 6,553,831 B1
(45) Date of Patent: Apr. 29, 2003

(54) SPRING-MOUNTED WHEEL BALANCING WEIGHT

(75) Inventors: Steven John Schmidt, Franklin, TN (US); William Carl Thon, Clarkson, MI (US); Kevin William Quillen, Murfreesboro, TN (US)

(73) Assignee: Perfect Equipment Company LLC, LaVergne, TN (US)

(*) Notice: Subject to any disclaimer, the term of this patent is extended or adjusted under 35 U.S.C. 154(b) by 0 days.

(21) Appl. No.: 09/723,367

(22) Filed: Nov. 28, 2000

(51) Int. Cl.[7] .......................... G01M 1/00; B60B 21/00

(52) U.S. Cl. .......................................... 73/470; 301/5.21

(58) Field of Search .......................... 73/458, 460, 462, 73/468, 469, 470, 471, 472, 473; 301/5.21, 5.22, 65

(56) References Cited

U.S. PATENT DOCUMENTS

| | | | | |
|---|---|---|---|---|
| 382,091 A | | 5/1888 | Kelsea | |
| 2,122,064 A | * | 6/1938 | Hume | 301/5.21 |
| 2,304,816 A | * | 12/1942 | Griffith | 301/5.21 |
| 2,370,361 A | * | 2/1945 | Jeune | 301/5.21 |
| 2,632,673 A | * | 3/1953 | Pfeiffer | 301/5.21 |
| 2,640,727 A | | 6/1953 | Kennedy | 301/5 |
| 2,765,998 A | | 10/1956 | Engert | 248/29 |
| 3,002,388 A | * | 10/1961 | Bageman | 301/5.21 |
| 3,154,347 A | | 10/1964 | Griffith | 301/5 |
| 3,273,941 A | | 9/1966 | Skidmore | 301/5 |
| 3,669,500 A | * | 6/1972 | Ende | 301/5.21 |
| 3,960,409 A | | 6/1976 | Songer | 301/5 |
| 4,300,803 A | | 11/1981 | Cjorosevic | 301/5 |
| 4,619,253 A | | 10/1986 | Anhauser et al. | 218/156 |
| 5,350,220 A | * | 9/1994 | Atwell, Jr. | 301/5.21 |
| 5,507,333 A | * | 4/1996 | Augier | 301/5.21 |
| 5,770,288 A | | 6/1998 | Carney, Jr. | 428/40.1 |
| 5,876,817 A | | 3/1999 | Mathna et al. | 428/40.1 |
| 6,413,626 B1 | * | 7/2002 | Wollner | 301/5.21 |

* cited by examiner

*Primary Examiner*—Helen Kwok
(74) *Attorney, Agent, or Firm*—Woodcock Washburn LLP

(57) ABSTRACT

A wheel balancing device mounts to a wheel containing a flange having generally opposing sides. The device comprises a pair of weighted bodies and a spring element connected to and interposed between the pair of weighted bodies. The device is mounted to the wheel by positioning the flange thereof between the weighted bodies. The spring element is biased to apply an interference spring force to the weighted bodies, where the force on the weighted bodies causes such bodies to grip the flange positioned therebetween.

17 Claims, 3 Drawing Sheets

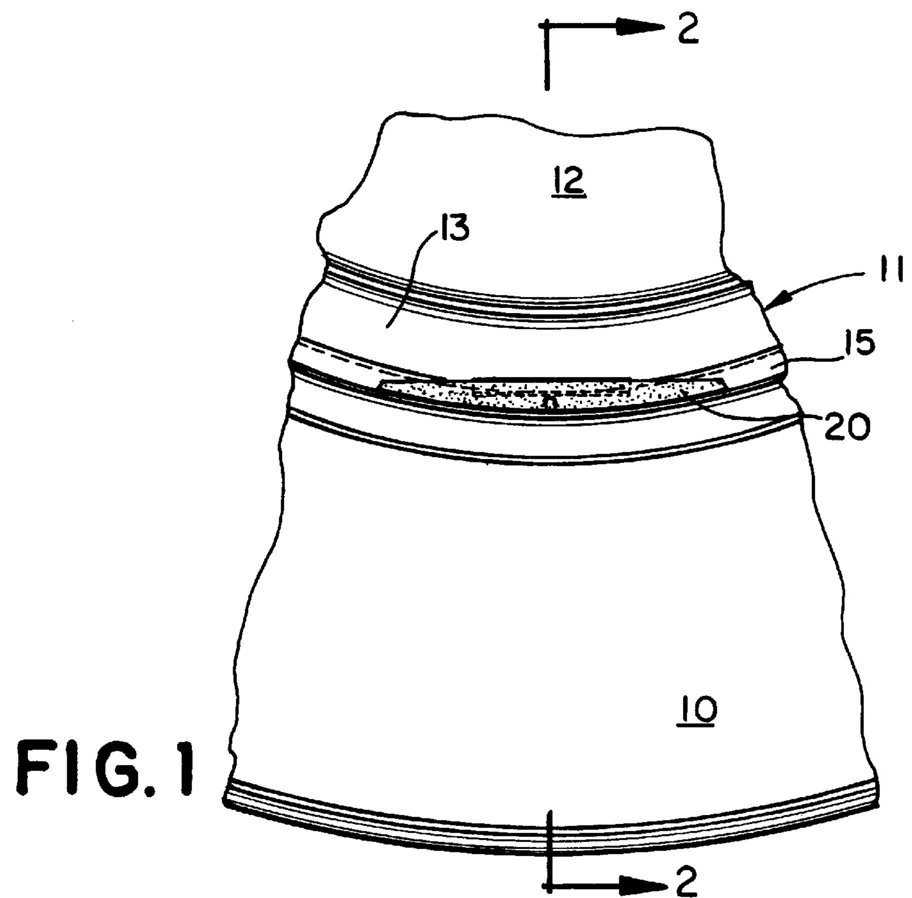
2
12
13
11
15
20
10
FIG. 1
2
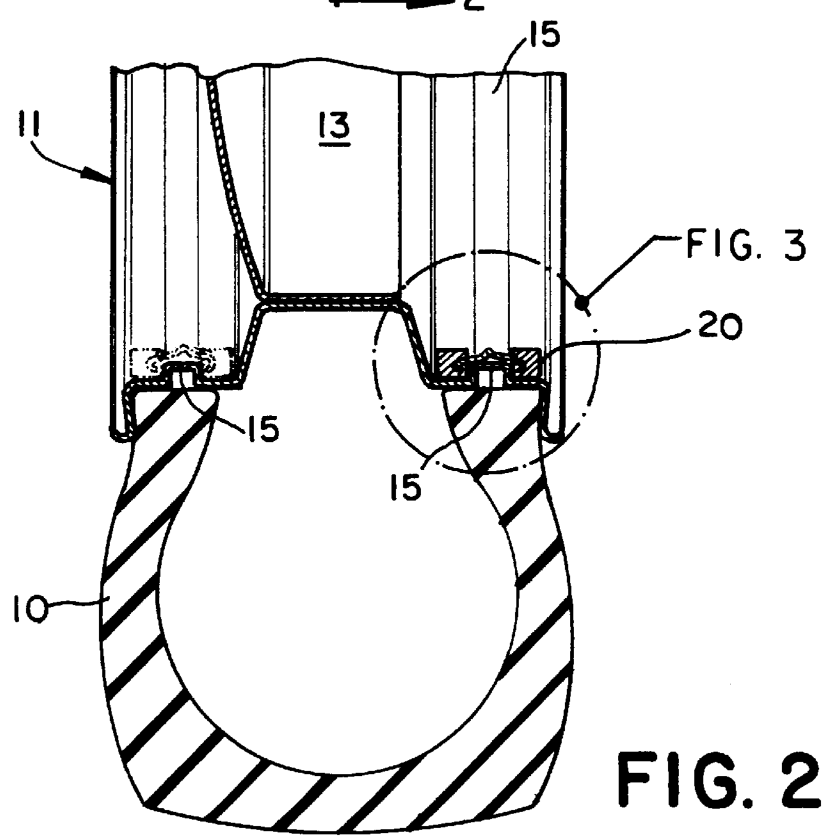
15
11
13
FIG. 3
20
15
15
10
FIG. 2

SPRING-MOUNTED WHEEL BALANCING WEIGHT

FIELD OF THE INVENTION

The present invention relates to a wheel-balancing device for balancing a wheel of a vehicle or the like. More particularly, the present invention relates to a wheel balancing device that includes a spring and that clips on to a portion of the wheel by way of interference spring force imparted by the spring.

BACKGROUND OF THE INVENTION

In the manufacture of pneumatic tires and also wheels and rims for pneumatic tires, it is exceedingly difficult if not impossible to produce a tire, a wheel, or the combination thereof in perfect rotational balance. As known, when out of balance, such a tire, wheel, or combination thereof, vibrates excessively upon rotation and can cause damage to adjacent, coupled-to and/or related components.

Accordingly, and as is known, such tire, wheel, or combination thereof is balanced by appropriately applying one or more counter-balancing weights to compensate for a measured imbalance. Methods of measuring imbalance and determining where to apply the counter-balancing weights are generally known to the relevant public and therefore need not be described herein.

Heretofore, such a counter-balancing weight has been constructed from lead or the like as a unitary mass around a steel clip which in turn is securely clipped on to an exterior circumferential flange or lip at the rim of the wheel. In addition, such a counter-balancing weight has been constructed with a coating of adhesive to appropriately adhere the weight directly to the wheel or rim.

At least with regard to the steel clip form of the weight, however, an issue arises in that in some instances it is not desirable to have an exterior flange. For example, such an exterior flange may interfere with a particular wheel (hub) cap, and/or may be considered aesthetically displeasing.

Accordingly, a need exists for an alternative mode for securing a counter-balancing weight to a wheel, at least in the case where there is no exterior outboard flange or where it is undesirable to use the exterior outboard flange. In particular, a need exists for a new counter-balancing weight design and a complementary wheel design for accepting the weight in a secure manner.

SUMMARY OF THE INVENTION

The aforementioned need is satisfied by a wheel balancing device for mounting to a wheel containing a flange having generally opposing sides. The device comprises a pair of weighted bodies and a spring element connected to and interposed between the pair of weighted bodies. The device is mounted to the wheel by positioning the flange thereof between the weighted bodies. The spring element is biased to apply an interference spring force to the weighted bodies, where the force on the weighted bodies causes such bodies to grip the flange positioned therebetween.

BRIEF DESCRIPTION OF THE DRAWINGS

The foregoing summary as well as the following detailed description of the present invention will be better understood when read in conjunction with the appended drawings. For the purpose of illustrating the invention, there are shown in the drawings embodiments that are presently preferred. As should be understood, however, the invention is not limited to the precise arrangements and instrumentalities shown. In the drawings:

FIG. 1 is a broken-away side-elevational view of a bottom portion of a pneumatic tire mounted to the rim of a wheel with a wheel-balancing device securely coupled to the rim in accordance with one embodiment of the present invention;

FIG. 2 is a cross-sectional view taken along line 2—2 of FIG. 1 in accordance with one embodiment of the present invention;

DETAILED DESCRIPTION OF PREFERRED EMBODIMENTS

Figure 3:
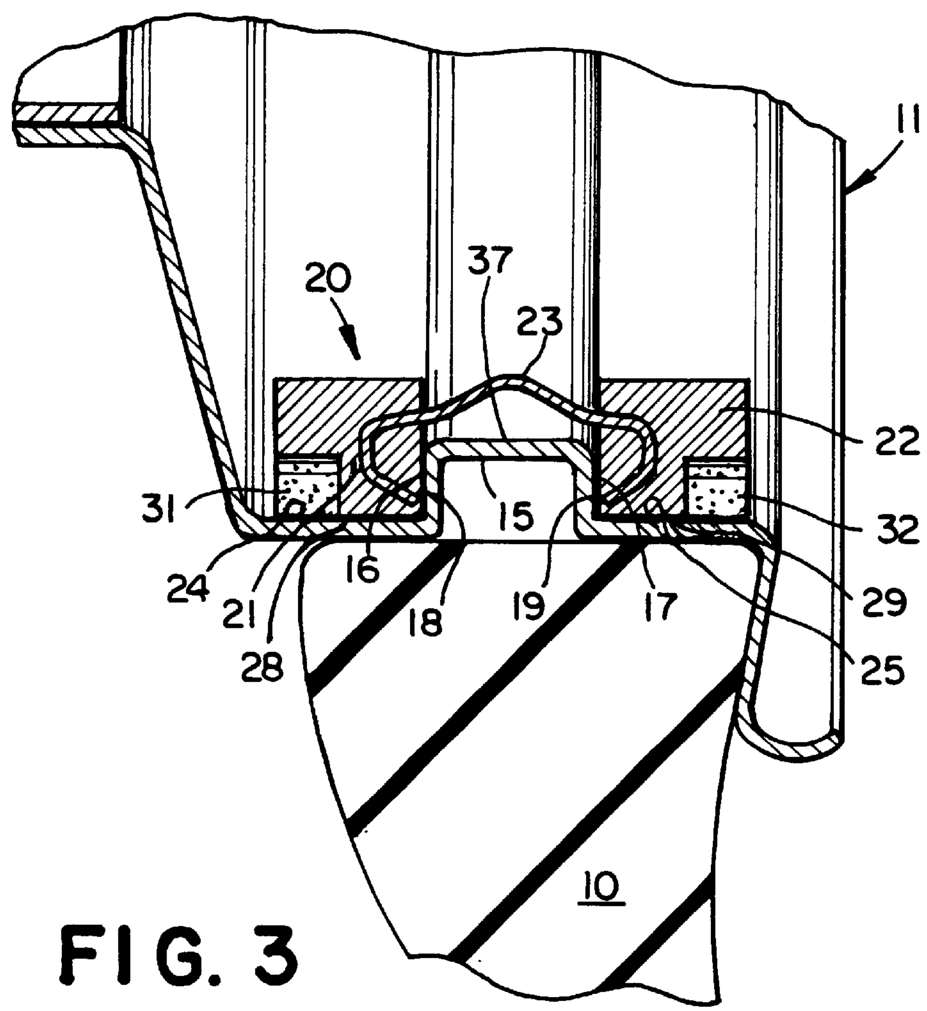
FIG. 3 is an enlarged view of a portion of FIG. 2, and shows the wheel-balancing device in accordance with one embodiment of the present invention.

Certain terminology may be used in the following description for convenience only and is not considered to be limiting. For example, the words "left", "right", "upper", and "lower" designate directions in the drawings to which reference is made. Likewise, the words "inwardly" and "outwardly" are directions toward and away from, respectively, the geometric center of the referenced object. The terminology includes the words above specifically mentioned, derivatives thereof, and words of similar import.

Referring to the drawings in detail, wherein like numerals are used to indicate like elements throughout, there is shown in FIGS. 1 and 2, a pneumatic tire 10 mounted upon a drop center rim 11 of a vehicle wheel 12.

It is to be appreciated that the tire 10 may be mounted to the wheel 12 in any conventional or unconventional manner and the tire 10 may be of any variety or manufacture without departing from the spirit or scope of the present invention. The tire 10 and wheel 12 or wheel 12 alone may be balanced manually or by spin balancing or by any other method without departing from the spirit and scope of the present invention. As is known, wheel 12 and wheel 12 with tire 10 mounted thereupon is balanced with respect to the axis thereof and in particular can be balanced on both the inboard (to the right in FIG. 2) and outboard (to the left in FIG. 2) sides of the wheel 12 at or about the rims 11 thereof. Generally, a wheel 12 with or without a tire 10 mounted upon the wheel 12 is balanced by measuring the imbalance and then attaching a weighted mass at an angular location on a rim 11 of the wheel 12 such that the measured imbalance is counter-balanced by the weighted mass.

As seen in FIG. 2, the drop center rim 11 of the wheel 12 extends axially and circumferentially. The wheel 12 also includes a central well portion 13 through which bolts on a vehicle typically extend to attach the wheel 12 to such vehicle (not shown). In one embodiment of the present invention, the rim 11 contains one or more flanges 15 extending radially inwardly from the rim 11 and circumferentially around the rim 11. As shown in FIG. 2, the rim 11 has an inboard flange 15 (to the right), shown in more detail in FIG. 3. FIG. 2 also shows an outboard flange 15 (to the left). Although only one flange 15 is shown on each of the inboard side and the outboard side, other quantities of flanges 15 and positions of flanges 15 may be employed without departing from the spirit and scope of the present invention.

Each flange 15 as shown may be constructed by crimping a portion of the rim 11 so as to form radially extending side faces 16, 17 and an axially extending top face 37 (FIG. 3). Thus, the flange 15, as shown, is generally rectangular in cross-section. It is to be recognized that the flange 15 may also have other dimensional features without departing from the spirit and scope of the present invention. As shown in the drawings, the flange 15 extends radially inwardly, but it should be understood that the flange 15 may extend in another direction. Additionally, the flange 15 may vary in dimension, location and in number, all without departing from the spirit and scope of the invention.

Referring now to FIG. 3, it is seen that a wheel-balancing device 20 is installed on the flange 15 in accordance with one embodiment of the present invention. The device 20 includes a pair of weighted bodies 21, 22 constructed from a material such as lead, connected by a spring element 23, constructed from a material such as spring steel. The weighted bodies 21, 22 may be constructed of any other material without departing from the spirit and scope of the present invention as long as the material is appropriate to achieve the desired weight and resists decomposition with use and exposure to external elements. Likewise, the spring element 23 may be constructed from any other appropriate material without departing from the spirit and scope of the present invention, as long as the material provides the necessary spring force as will be explained below and resists weakening with use and exposure to external elements.

As seen, the weighted bodies 21, 22 in the device 20 both extend in a generally longitudinal and generally parallel manner alongside each other, and the spring element 23 extends generally transversely between the weighted bodies, 21, 22. In one embodiment of the present invention, the device 20 is formed by molding the weighted bodies 21, 22, around the spring element 23 such that opposing portions of the spring element 23 are securely embedded within each body 21, 22. Thus, each body 21, 22, will likely not break off from the spring element 23 under stress. Any appropriate process for constructing the device 20 may be employed without departing from the spirit and scope of the present invention. The specifics of such construction process are known or should be apparent to the relevant public and therefore need not be described herein in any detail.

In one embodiment of the present invention, and still referring to FIG. 3, the wheel-balancing device 20 is mounted to the flange 15 by positioning one weighted body 21, 22 on each side of the flange 15. As was discussed above, the device 20 is mounted on the flange 15 at a particular circumferential location thereon in an effort to achieve balancing of the wheel 12 or the wheel 12 and tire 10 thereon.

Figure 5:
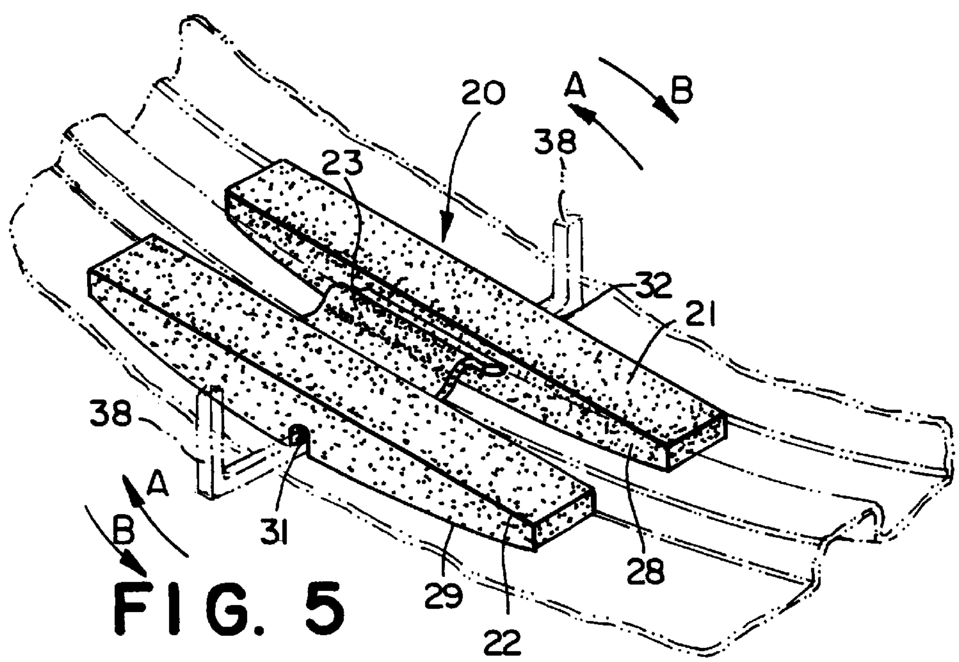
FIG. 5 is a perspective view of the device as shown in FIGS. 1–3 including a portion of a tool for mounting the device to the rim of a wheel.

Preferably, in the course of mounting the device 20 to the flange 15, a biasing force is applied to bias the spring element 23 along an axis generally parallel to and above and between the longitudinally extending weighted bodies 21, 22. That is, the spring element 23 is biased so as to move the weighted bodies 21, 22 in the respective directions of the arrows A as seen in FIG. 5. Also preferably, in an un-biased state, the minimum distance between the inner side surfaces 18, 19 of the weighted bodies is less than the distance between the side faces 16, 17 of the flange 15.

Accordingly, when the spring element 23 is in fact biased so as to move the weighted bodies 21, 22 in the respective directions of the arrows A as seen in FIG. 5, the minimum distance between the inner side surfaces 18, 19 of the weighted bodies increases to an amount greater than the distance between the side faces 16, 17 of the flange 15. In such biased state, then, the device 20 may be positioned with respect to the flange 15 such that the flange 15 is interposed between the weighted bodies. As may be appreciated, in such position, the biasing force may be released to allow the weighted bodies 21, 22 to move in the respective directions of the arrows B as seen in FIG. 5, where such arrows B are generally opposite arrows A. As may also be appreciated, since the minimum distance between the inner side surfaces 18, 19 of the weighted bodies 21, 22 in an unbiased state is less than the distance between the side faces 16, 17 of the flange 15, the spring element 23 and device 20 do not return to an un-biased state. Instead, and importantly, the spring element 23 continues to apply a biasing interference spring force to the weighted bodies 21, 22 when the external biasing force is removed. Such force thereby causes the weighted bodies 21, 22 to securely grip the flange 15 positioned therebetween.

Preferably, the weighted bodies 21, 22 are in close frictional contact with the flange 15 and the wheel 12. Accordingly, the gripping action of the weighted bodies 21, 22 on the flange 15 in combination with the close frictional contact allows the device 20 to resist circumferential sliding movement along the mounted-to flange 15. As may be appreciated, such sliding movement can otherwise occur, especially at times when the rate of rotation of the wheel 12 is changing. As may also be appreciated, such sliding movement upsets the balance formerly achieved by positioning the device 20 at a particular circumferential location on the flange 15.

To provide such close frictional contact, the inside axial surfaces 18, 19 of each of the weighted bodies 21, 22 are preferably in close facing contact with the side faces 16, 17 of the flange 15, and the bottom surfaces 28, 29 of the weighted bodies 21, 22 are preferably in close facing contact with the radially inward facing surfaces 24, 25 of the rim 11 on either side of the flange 15. Of course, any other means may be employed to provide such close frictional contact and resist circumferential sliding movement without departing from the spirit and scope of the present invention.

Figure 4:
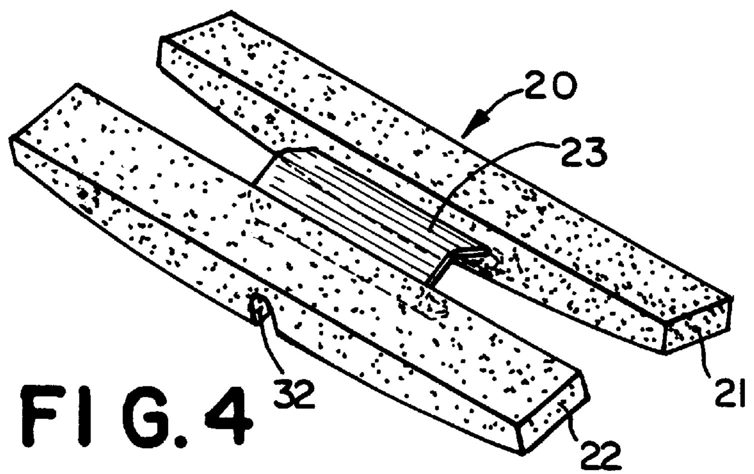
FIG. 4 is a perspective view of the wheel-balancing device as shown in FIGS. 1–3.

To ensure that the bottom surfaces 28, 29 of the weighted bodies 21, 22 are in close facing contact with the radially inward facing surfaces 24, 25 of the rim 11, and remembering that such surfaces 24, 25 are generally cylindrical, it is preferable that the bottom surface 28, 29 of each of the weighted bodies 21, 22 is generally longitudinally arcuate, as seen in FIG. 4. Preferably, such surfaces 28, 29 have substantially the same radius of curvature as the radius of curvature of the radially inward facing surfaces 24, 25 (FIG. 3) along either side of the flange 15. Thus, when the device 20 is mounted to the wheel 12, the bottom surfaces 28, 29 of the weighted bodies 21, 22 are in fact in close facing contact with the radially inwardly facing surfaces 24, 25.

To further ensure that the weighted bodies 21, 22 are in close frictional contact with the flange 15 and the wheel 12, the weighted bodies 21, 22 are provided with a surface having a relatively high coefficient of friction. Such surface may be imparted to the bodies 21, 22 during formation thereof, or may be imparted afterward by way of a surface coating such as that shown in FIG. 4. As may be appreciated, a surface coating provides additional benefits in that encapsulation of the bodies 21, 22 therein may protect the bodies 21, 22 from external elements, and also may protect external elements from the bodies 21, 22. Such a surface coating may be any appropriate surface coating without departing from the spirit and scope of the present invention.

In one embodiment of the present invention, the surface coating is a covering including a surface layer of a material such as polyester and a sub-layer of a material such as epoxy.

The surface layer may be constructed from any appropriate material without departing from the spirit and scope of the present invention, as long as the material has the aforementioned relatively high coefficient of friction, is durable, and protects the device 20 and external elements from each other. Likewise, the sub-layer may be constructed from any appropriate material without departing from the spirit and scope of the present invention, as long as the material securely bonds the surface layer to the device 20. Note that the spring element 23 may (FIG. 5) or may not (FIG. 4) be encapsulated within the surface coating. At any rate, the process of constructing the device 20 will likely be simpler if the spring element 23 is so encapsulated.

To still further ensure that the weighted bodies 21, 22 are in close frictional contact with the flange 15 and the wheel 12, the rim 11 and the flange 15 may also be provided with a surface having a relatively high coefficient of friction (not shown). Similar to the device 20, such surface may be imparted to the rim 11 and flange 15 during formation thereof, or may be imparted afterward by way of a surface coating.

As seen in FIGS. 3–5, the weighted bodies 21, 22 each define an aperture 31, 32 extending therein. The apertures 31, 32 in combination are for the insertion of a tool 38 (a portion of which is shown in FIG. 5) to bias the spring element 23 during mounting of the device 20 on the flange 15, as was discussed above. In one embodiment of the present invention, and as shown, the apertures 31, 32 extend into the weighted bodies 21, 22 from generally opposing sides of the device 20 and also from generally opposing sides of the spring element 23. As seen, each of the apertures 31, 32 is located at the approximate midpoint of each weighted body 21, 22, and extends into the weighted body 21, 22 from both the bottom surface 28, 29 and the outside face 33, 34 of the weighted body 21, 22.

It should be appreciated, though, that the apertures 31, 32 may be located in any other appropriate position on the weighted bodies 21, 22 without departing from the spirit and scope of the described invention, as long as the spring element 23 can be biased by insertion of the tool 38 into the apertures 31, 32 as located. Moreover, a plurality of apertures 31, 32 for insertion of the installation tool 38 may be defined in each weighted body 21, 22 (not shown) without departing from the spirit and scope of the invention.

The tool 38 may be any appropriate tool without departing from the spirit and scope of the present invention. For example, the tool 38 may have prongs that are inserted into the apertures 31, 32, handles and a central member, whereby when the handles are squeezed, the central member exerts counter-balancing downward force on the spring element 23 and the prongs spread apart in a reverse scissors action, thereby applying a biasing force to the spring element 23.

Figure 6:
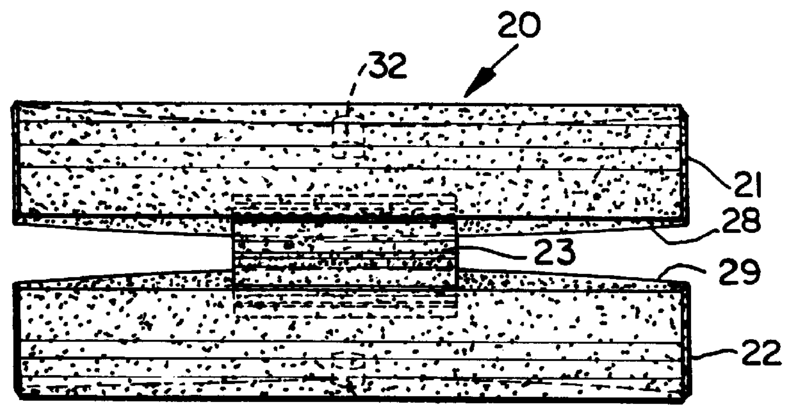
FIG. 6 is a top plan view of the weight as shown in FIG. 5, in an unbiased position.
Figure 7:
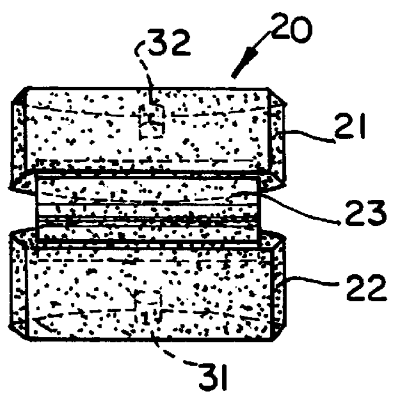
FIG. 7 is a top plan view of a variation of the counter-balancing weight of the present invention in an unbiased position.

Owing to the fact that the device 20 must be available in several different weights, such device 20 is in fact manufactured in a plurality of different weights and sizes, examples of which are shown in FIGS. 6 and 7. For example, the device 20 may be manufactured in weights of approximately 5 grams to 170 grams, in 5 gram increments, the width (left to right in FIG. 3) of the weighted bodies 21, 22 may vary from 6 mm to 14 mm, in 2 mm increments, and the length (left to right in FIG. 6) may vary from approximately 0.76 mm (0.030") to 1.5 mm (0.060"). Likewise, the height (top to bottom in FIG. 3) may also vary. It should be appreciated, however, that any particular dimensions may be employed in the length, width, height, and weight of the weighted bodies 21, 22 without departing from the spirit and scope of the present invention. It should also be appreciated that the weighted bodies 21, 22 may be dispensed with altogether (not shown) such that only the spring element 23 is present in the device 10, especially in the case where only a minimal weight on the order of a few grams is needed.

In the preferred embodiment of the invention the flange 15 is 8 mm wide and 4.25 mm tall, with 1.5 mm corner radii. However, the flange 15 may have another appropriate dimensions without departing from the spirit and scope of the present invention. Moreover, such dimensions may be rectangular or non-rectangular in nature, again without departing from the spirit and scope of the present invention, so long as the flange 15 can be constructed on the rim 11 and is capable of being securely grasped by the device 20. Note that for a non-rectangular flange 15, the device 20 may require modifications, including modifications to ensure close frictional contact therewith as necessary.

In an alternate embodiment of the present invention (not shown), the drop center rim 11 contains a pair of adjacent, generally parallel flanges 15 between which is installed the wheel-balancing device 20. Here, though, and as may be appreciated, the spring element 23 when biased causes the weighted bodies 21, 22 to push away from each other and thereby wedge the device 20 securely between the two adjacent flanges 14, 15.

In the foregoing description, it can be seen that the present invention comprises a new and useful device that allows the mounting of a wheel-balancing device 20 to a wheel 12 having no exterior flange or where mounting on such exterior flange is not desired. It should be appreciated that changes could be made to the embodiments described above without departing from the inventive concepts thereof. For one example, although the weighted bodies 21, 22 are represented in the drawings to be of similar size and accordingly of similar weight, it is to be appreciated that the weighted bodies 21, 22 may also be of dissimilar size and weight without departing from the spirit and scope of the present invention. For another example, the presence of a tire 10 is not essential to the present invention and the invention encompasses the use of the wheel-balancing device 20 to counter-balance the wheel 12 only. It should be understood, therefore, that this invention is not limited to the particular embodiments disclosed, but it is intended to cover modifications within the spirit and scope of the present invention as defined by the appended claims.

What is claimed is:

1. A wheel balancing device for mounting to a wheel containing a flange having generally opposing sides, the device comprising:

a pair of weighted bodies; and a spring element connected to and interposed between the pair of weighted bodies, wherein the device is mounted to the wheel by positioning the flange thereof between the weighted bodies, the spring element being biased to apply an interference spring force to the weighted bodies, the force on the weighted bodies causing such bodies to grip the flange positioned therebetween, the weighted bodies being substantially entirely coated with a surface covering, the surface covering minimizing direct contact of the weighted bodies with external elements.

2. The device of claim 1 wherein the flange extends circumferentially and radially inwardly and has opposing axial sides, and wherein each weighted body is to be positioned on one of the axial sides of the flange.

3. The device of claim 2 wherein the wheel has a radially inwardly facing surface on either side of the flange, wherein the weighted bodies each have bottom surfaces, and wherein the bottom surfaces are to be in close facing contact with the radially inwardly facing surfaces of the wheel when the device is mounted to the flange.

4. The device of claim 3 wherein the radially inwardly facing surfaces of the wheel and the bottom surfaces of the weighted bodies each have a generally common radius of curvature.

5. The device of claim 1 wherein each weighted body defines an aperture extending therein, the apertures in combination for accepting a tool inserted thereinto to bias the spring element during mounting of the device.

6. The device of claim 5 wherein the apertures extend into the weighted bodies from generally opposing sides of the device.

7. The device of claim 5 wherein the apertures extend into the weighted bodies from generally opposing sides of the spring element.

8. The device of claim 5 wherein a plurality of apertures extend into each weighted body.

9. A wheel balancing device for mounting to a wheel containing a flange having generally opposing sides, the device comprising:

a pair of weighted bodies; and a spring element connected to and interposed between the pair of weighted bodies, wherein the device is mounted to the wheel by positioning the flange thereof between the weighted bodies, the spring element being biased to apply an interference spring force to the weighted bodies, the force on the weighted bodies causing such bodies to grip the flange positioned therebetween, the weighted bodies being coated with a non-adhesive surface covering in a region of direct contact with the flange, the surface covering having a relatively high coefficient of friction, the weighted bodies being securely mounted to the flange and the high coefficient of friction of the surface covering in contact with the flange minimizing movement of the weighted bodies with respect to the flange.

10. The device of claim 9 wherein the weighted bodies are coated with an epoxy sub-layer and a polyester surface layer.

11. The device of claim 9 wherein the spring element is also coated with the surface covering.

12. The device of claim 1 wherein the weighted bodies are coated with an epoxy sub-layer and a polyester surface layer.

13. The device of claim 1 wherein the spring element is also coated with the surface covering.

14. The device of claim 1 wherein the weighted bodies are separated by a minimum distance when the spring element is unbiased, wherein the flange has a pre-determined width, and wherein the minimum separation distance of the weighted bodies when the spring element is unbiased is less than the pre-determined width of the flange.

15. The device of claim 1 wherein the wheel contains a pair of flanges such that a distance between opposing axial sides of the flanges is pre-determined, and such pre-determined distance is less than a maximum separation distance of the weighted bodies when the spring element is unbiased.

16. The device of claim 1 wherein the weighted bodies each have facing surfaces facing one another, and wherein each facing surface is in close facing contact with a respective side of the flange when the device is mounted to the flange.

17. The device of claim 1 in which the spring element is constructed from a spring steel.

* * * * *